United States Patent [19]

Straub

[11] Patent Number: 5,310,223
[45] Date of Patent: May 10, 1994

[54] PIPE COUPLING

[75] Inventor: Immanuel Straub, Wangs, Switzerland

[73] Assignee: Straub Federnfabrik AG, Wants, Switzerland

[21] Appl. No.: 400

[22] Filed: Jan. 4, 1993

[30] Foreign Application Priority Data

Jan. 16, 1992 [CH] Switzerland .................. 00115/92

[51] Int. Cl.$^5$ .............................................. F16L 17/04
[52] U.S. Cl. ..................................... 285/112; 285/373
[58] Field of Search ............... 285/112, 105, 373, 340

[56] References Cited

U.S. PATENT DOCUMENTS

| 2,201,372 | 5/1940 | Miller ..................... 285/105 |
| 2,491,004 | 12/1949 | Graham ................. 285/340 X |
| 2,852,282 | 9/1958 | Smisko et al. ............ 285/112 |
| 3,116,078 | 12/1963 | Scherer . |
| 3,432,189 | 3/1969 | Buller ..................... 285/340 X |
| 3,582,112 | 6/1971 | Pico ........................ 285/105 X |
| 3,877,733 | 4/1975 | Straub . |
| 4,119,333 | 10/1978 | Straub . |
| 4,629,217 | 12/1986 | Straub . |
| 4,664,422 | 5/1987 | Straub . |
| 4,717,179 | 1/1988 | Haberstock et al. ........ 285/112 |
| 4,822,083 | 4/1989 | Meinig . |
| 4,842,306 | 6/1989 | Zeidler et al. ............ 285/373 X |

FOREIGN PATENT DOCUMENTS

580053/86 12/1986 Australia .
995710 8/1976 Canada .

OTHER PUBLICATIONS

U.S. application Ser. No. 07/716,139; Filed Jun. 17, 1991; Immanuel Straub; Pipe Coupling.

Primary Examiner—Randolph A. Reese
Assistant Examiner—Heather Chun
Attorney, Agent, or Firm—Willian Brinks Hofer Gilson & Lione

[57] ABSTRACT

An elastomer sealing sleeve 32 of C-shaped cross section is disposed in a contractible housing 10 and includes sealing lips 36 which extend towards each other and which, upon the contraction of the housing 10 and the simultaneous upending of the sleeve 32, are brought to bear snugly against the pipe wall 55. The front face 38 of the sleeve 32 is divided up into two oppositely directed conical surfaces 58, 60, which are embraced by a supporting ring 40 of V-shaped cross section. The inner flank 62 of the supporting ring is positioned between the radially inner surface 58 and the clamping ring 20 supported in the throat of the housing 10 and, in so doing, bridges the recesses 26 in the clamping ring 20. The outer flank 63 of the supporting ring supports the sleeve 32 in the area of the radially outer surface 60. This pipe coupling is particularly simple in its construction and is suitable for high operating temperatures and for large temperature changes.

9 Claims, 1 Drawing Sheet

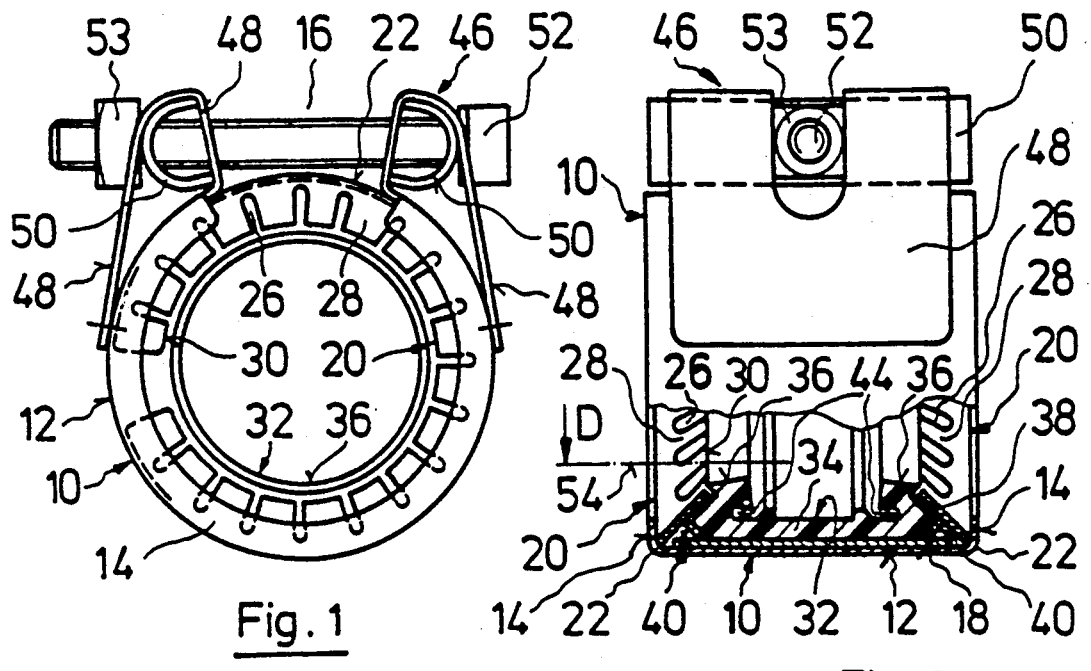
Fig. 1
Fig. 2
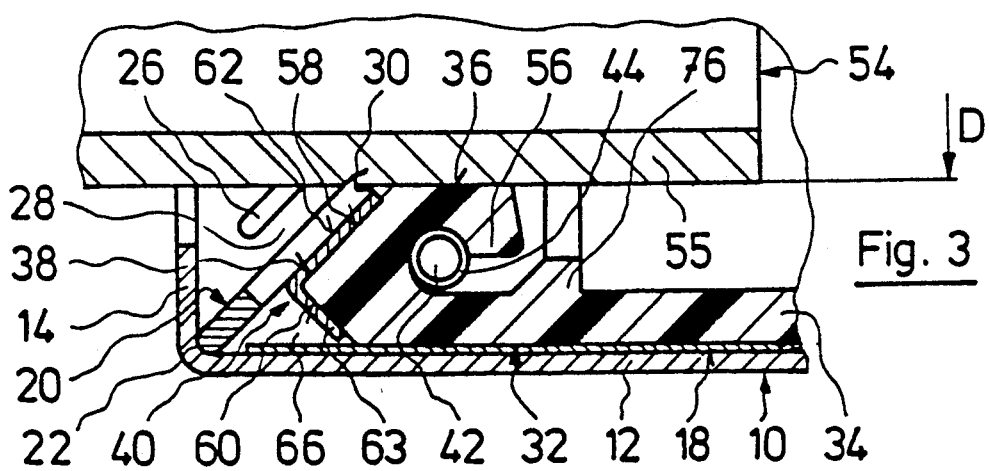
Fig. 3
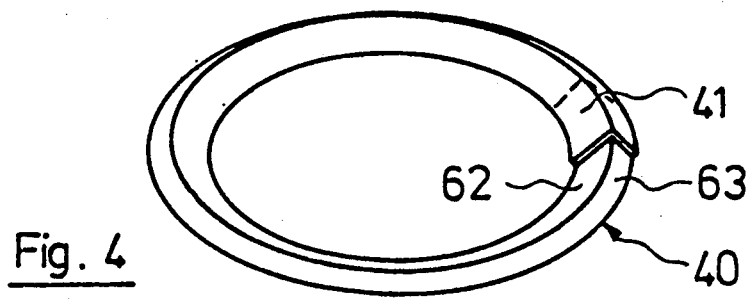
Fig. 4

PIPE COUPLING

BACKGROUND OF THE INVENTION

The present invention relates to a pipe coupling having some of the features of the pipe coupling shown in DE-A-27 31 465 or from the corresponding U.S. Pat. No. 4,119,333. An elastomer sealing sleeve of C-shaped cross section is embraced by a contractible housing having radial end walls. The axial border areas of the sleeve are of wedge-shaped configuration when viewed in cross section, so that the front faces exhibit a conical, radially inner surface, converging in the direction of the longitudinal center of the housing, and an inversely conical, radially outer surface. The sleeve bar is enclosed by an open-ended insert plate, which bridges the housing gap and which exhibits radially inwardly angled-off borders in order to support the sleeve on its front side, in the area of the radially outer surface. Frustoconical clamping rings, which converge in the direction of the longitudinal center of the housing and which are supported by their outer border in the throat between the housing casing and the end walls, support the sleeve, with their inner, laminated border areas at the radially inner surfaces of the front faces. In order to hold the clamping rings in the housing and prevent the angled-off borders of the steel ribbon insert from spreading open under the pressure of the sleeve when the housing is compressed, the space between the border of the steel ribbon insert, the housing casing and the clamping ring in question is filled in each case by a solid spring ring of triangular cross section. A further spring ring of circular cross section reaches in each case between the clamping ring and the end wall in question of the housing. This pipe coupling exhibits outstanding sealing properties even where there is a rough or irregular pipe surface.

SUMMARY OF THE INVENTION

The object of the present invention is to simplify the pipe coupling of the generic type whilst making the support for the sleeve less wearing.

According to this invention, a pipe coupling of the type defined by the preamble of claim 1 is provided with a supporting ring positioned to support one of the end faces of the sealing sleeve. This supporting ring is V-shaped in cross section and is contractible in the peripheral direction. The supporting ring comprises a radially inner flank and a radially outer flank. The sealing sleeve defines two faces, each comprising a conical, radially inner surface which converges toward the central region of the housing and is supported by a respective clamping ring, and an oppositely directed, conical, radially outer surface. The inner flank of the supporting ring is disposed between the radially inner surface of the sleeve and the respective clamping ring, and the radially outer flank supports the radially outer surface of the sleeve.

The supporting ring described below, which is of V-shaped cross section and is therefore extremely stable, not only renders redundant the spring rings which are used in the pipe coupling described above, but also covers slits present in the inner border area of the clamping rings or edges produced by the lamination. This enables any optional configuration of the inner border and of the inner border area of the clamping rings to be used for optimum engagement with the pipes whenever the housing is compressed, without consideration having to be given to possible injury to the sleeve. The insert plate does not have to perform any front-sided supporting function, and can thus be more simply shaped.

A particularly preferred embodiment of the pipe coupling according to the invention prevents flowing of the sleeve material in the event of thermal expansion or pressure expansion, thereby enabling an increase in the permitted operating temperature and also greater temperature changes.

Further preferred embodiments of this invention are defined in the dependant claims.

BRIEF DESCRIPTION OF THE DRAWINGS

The present invention will now be explained in greater detail below with reference to an illustrative embodiment represented in the drawings, in which purely diagrammatic representations are made as follows:

FIGS. 1 and 2 show the preferred embodiment of the pipe coupling according to the invention in plan view and side view respectively, in partial cutaway;

FIG. 3 shows a part of the pipe coupling of FIGS. 1 and 2 in a longitudinal section and on an enlarged scale, after it has been fitted to pipes to be coupled; and FIG. 4 shows a perspective representation of a supporting ring included in the pipe coupling of FIGS. 1-3.

DETAILED DESCRIPTION OF THE PREFERRED EMBODIMENTS

The housing 10, which is represented in FIGS. 1 and 2 and which is split along its length, includes a cylindrical housing casing 12 and inwardly curved radial end walls 14. A flat insert plate 18 bridges the housing gap 16, and bears against the inner side of the housing casing 12. The open-ended insert plate 18 is aligned in relation to the housing gap 16 in such a way, of course, that the longitudinal gap of the insert plate 18 does not lie in the area of the housing gap 16, but preferably lies diametrically opposite this.

The pipe coupling further includes two frustoconical clamping rings 20, which are configured to converge in the direction of the longitudinal center of the housing 10 and which are held by their outer border 22 in the housing 10 in the throat between the housing casing 12 and the respective end wall 14. In the inner border area, the clamping rings 20 define a plurality of laminae 28 produced by slot-like recesses 26. The free end edge 30 of each of these laminae 28 thus forms a claw, which is designed to bury itself into the contact surface of the pipe ends to be interconnected and to claw on tightly.

In the space limited by the housing 10, the insert plate 18 and the clamping rings 20, there is disposed a continuous elastomer sealing sleeve 32 of C-shaped cross section, which bears with its sleeve bar 34 against the insert plate 18 or housing casing 12 such that the sealing lips 36 of the sleeve 32 extend towards each other. The front faces 38 of the sleeve 32 are each embraced by a supporting ring 40 of V-shaped cross section, the construction and operating method of which are described further below.

Moreover, a spring ring 44 formed by a closed tension spring is positioned in the annular groove 42 limited by the sleeve bar 32 and the sealing lip 36 in question. The spring ring 44 supports the sealing lip 36 with respect to the sleeve bar 34 and draws the sealing lip 36 radially inwardly, toward the pipes to be coupled.

The housing 10 further includes a closure 46, comprising clamping tongues 48 welded onto the housing 10, clamping bars 50, which are of U-shaped cross section and are enclosed by the said clamping tongues, and a clamping screw 52 with a nut 53. The clear width of the pipe coupling (housing 10, sleeve 32, insert plate 18, clamping rings 20, supporting rings 40, spring rings 44) is so amply proportioned in the opened state represented in FIGS. 1 and 2 that, in relation to the outer diameter of the pipes 54 indicated in FIG. 2 by an arrow D, an overmeasure is in any event present, so that the coupling can be slid easily over the one pipe 54 and, following laying of the pipes 54, can also be slid across onto the other pipe end. By tightening the clamping screw 52, the inner diameter of the housing 10, as in the case of a pipe clip, can be reduced, the housing gap 16 being diminished and the ends of the insert plate 18 coming closer together in the housing 10. In this event, the sleeve 32 is upended in the peripheral direction, the spring rings 44 and the tori 56 formed onto the sealing lips 36 bringing the sealing lips 36 snugly to bear against the pipe wall 55, as can be seen from FIG. 3. At the same time, there is also a contraction in the open-ended clamping rings 20, which are configured such that they form approximately one winding when the housing 10 is fully compressed. Upon the contraction of the housing 10, the free end edges 30 of the laminae 28 are therefore anchored in the pipe wall 55 as a result of the axial and radial support offered by the clamping rings 20 against the housing 10. Consequently, not only is the pipe coupling fixed to the pipes 54, but also the pipes 54 are prevented from slipping out of the pipe coupling as a result, for example, of pressure generated axial forces. In FIG. 3, only the one end area of the pipe coupling is shown in each case, the other, axially opposite end area being, of course, of similar configuration and functioning identically.

The front faces 38 of the sleeve 32 are divided up into two conical surfaces, the radially inner surface 58 being configured to converge in the direction of the longitudinal center of the housing 10 and hence being approximately parallel to the clamping ring 20 in question. The radially outer surface 60 is of inversely conical configuration, so that these two surfaces 58, 60 run approximately at right-angles to each other. As shown in particular in FIG. 3, the V-shaped supporting ring 40 bears with its radially inner flank 62 against the sleeve 32 in the area of the inner surface 58, and with its outer flank 63 supports the said sleeve in the area of the outer surface 60. The open-ended and thus contractible supporting ring 40 is configured to form something more than one winding, so that its end sections 41, situated on both sides, overlap each other as shown in FIG. 4.

The supporting rings 40 thus engage with their inner flanks 62 into the area between the radially inner surface 58 of the front faces 38 of the sleeve 32 and the clamping rings 20, and thus bridge the recesses 26 in the inner border area of the clamping rings 20. Any injury to the sleeve 32 is thereby prevented from sharp edges or the flowing of material into the recesses 26 or the cavities 66 whenever, due to pressure expansion and thermal expansion, the flow limit of the material of the sealing sleeve 32 is reached. In the radial direction, the flanks 62, 63 are of somewhat shorter configuration than the corresponding surfaces 58, 60 of the sleeve 32. The flanks 62, 63 are designed however such that, when the housing 10 is contracted, the supporting ring 40, as shown in FIG. 3, bears at the inner end against the pipe wall 55 and at the outer end against the insert plate 18, which, viewed in the axial direction, projects over the supporting ring 40 or at most leaves a thin gap. When the housing 10 is braced, the supporting ring 40 thus slides along the clamping ring 20 in the direction of the cavity 66 limited by the clamping ring 20 and the housing casing 12 or insert plate 18. Due to its V-shaped cross section and its annular form, the supporting ring 40, made from high-strength steel, has high natural stability. The bearing of the inner flank 62 against the clamping ring 20 and the resting of the border of the outer flank 63 against the insert plate 18 additionally prevents any possibility of the supporting ring 40 spreading open and the double-sided contact-bearing of the supporting ring 40 prevents any or the material of the sleeve 33 from flowing away at higher operating temperatures.

As can be particularly clearly seen from FIG. 3, the torus 56 is formed onto the sealing lip 36 in that end area of the sealing lip 36 adjoining the free end, on the side facing the sleeve bar 34, so that the annular groove 42 exhibits a type of undercut for the spring ring 44.

Annular ribs 76, which are pre-mounted in front of the annular grooves 42 and overlap these, are formed onto the sleeve bar 34, which annular ribs, in the pressureless state or in a vacuum, prevent the sleeve bar 34 from lifting up from the insert plate 18. The ribs 78 also make it impossible for the spring ring 44 to slip inadvertently out of the annular groove 42.

Irrespective of the ageing of the elastomer material of the sleeve 32, the sealing lip 36 is always held securely by the spring ring 44 to bear snugly against the pipe wall 55. This result is obtained even in the event of a possible vacuum in the pipes 54 and in the interior of the pipe coupling, which is linked via the pipe joint to the said pipes. Since material of the sleeve 32 is prevented by the supporting ring 40 from flowing away into the recesses 26 of the clamping ring 20 and to other cavities 66 at high temperatures, higher operating temperatures and also greater temperature changes are permissible for the pipe coupling described above than in the case of known pipe couplings.

I claim:

1. In a pipe coupling of the type comprising: an elastomer sealing sleeve of C-shaped cross section, said sealing sleeve defining a sleeve bar and a plurality of sealing lips supported on the sleeve bar to extend toward one another; a housing enclosing the sealing sleeve and defining a radially extending longitudinal gap such that the housing is discontinuously formed in a peripheral direction and the housing is contractible in the peripheral direction; said housing comprising a closing mechanism and an insert plate inserted between the sealing sleeve and the housing to bridge the longitudinal gap; said sealing lips, prior to compression of the housing, defining an inside dimension greater than an outside dimension of pipes to be coupled, and upon compression of the housing being able to be upset in the peripheral direction and thereby pressed snugly against respective pipes; the improvement comprising:

said housing having radial end walls;

a plurality of frustoconical clamping rings configured to converge toward a central region of the housing and restrained axially by the respective end walls;

said sleeve defining two faces, one face at each axial end thereof, each face comprising a conical, radially inner surface which converges toward the central region of the housing and is supported by the respective clamping ring, and an oppositely directed, conical, radially outer surface in its operable state;

at least one supporting ring positioned to support one of the faces of the sleeve, said supporting ring being of V-shaped cross section and contractible in the peripheral direction, said supporting ring comprising a radially inner flank disposed between the radially inner surface of the sleeve and the respective clamping ring, and a radially outer flank which supports the radially outer surface of the sleeve, said supporting ring discontinuous in the peripheral direction and comprising two end sections, said two end sections overlapping one another in the peripheral direction in the operable state.

2. The pipe coupling as claimed in claim 1, wherein the supporting ring, when the housing is compressed, substantially bridges the space between the pipe wall and the housing and the insert plate.

3. The pipe coupling as claimed in claim 1, wherein the insert plate projects axially over a radially outer edge of the outer flank of the supporting ring.

4. The pipe coupling as claimed in claim 1, wherein the supporting ring is made of high-strength steel.

5. The pipe coupling as claimed in claim 1, wherein the clamping rings comprise laminae which are defined in an inner border area by recesses adjacent the inner flank of the supporting ring.

6. The pipe coupling as claimed in claim 1, wherein the clamping rings are divided in the peripheral direction by at least one gap, and wherein the supporting rings bridge the gap in the clamping rings.

7. The pipe coupling as claimed in claim 2 wherein the supporting ring, when the housing is compressed, bears against the pipe wall and the insert plate.

8. The pipe coupling as claimed in claim 1 wherein the supporting ring provides continuous support to the respective face of the sleeve.

9. The pipe coupling as claimed in claim 8, wherein the supporting ring is free of notches and apertures adjacent the respective face of the sleeve.

* * * * *